United States Patent [19]

Bauer et al.

[11] Patent Number: 4,594,746
[45] Date of Patent: Jun. 17, 1986

[54] WINDSHIELD WIPER UNIT

[75] Inventors: Kurt Bauer, Ingersheim; Reinhard Edele, Bietigheim-Bissingen; Bruno Egner-Walter, Heilbronn; John M. Longney, Sachsenheim; Eckhardt Schmid, Brackenheim; Wolfgang Scholl, Gemmrigheim; Walter Wagner, Heilbronn; Anton Epple, Rottenberg; Hans Trube, Herrenberg; Martin Pfeiffer, Stuttgart; Josef Berger, Wolfschlugen, all of Fed. Rep. of Germany

[73] Assignees: SWF Auto-Electric GmbH, Bietigheim-Bissingen; Daimler-Benz, Stuttgart, both of Fed. Rep. of Germany

[21] Appl. No.: 646,412

[22] Filed: Aug. 31, 1984

[30] Foreign Application Priority Data

Aug. 31, 1983 [DE] Fed. Rep. of Germany ....... 3331309

[51] Int. Cl.⁴ .............................................. B60S 1/34
[52] U.S. Cl. .............................. 15/250.21; 15/250.29; 15/250.34

[58] Field of Search .......... 15/250.21, 250.23, 250.31, 15/250.34, 250.35, 250.29

[56] References Cited

FOREIGN PATENT DOCUMENTS

| 458233 | 7/1949 | Canada ............................ 15/250.34 |
| 2413620 | 9/1975 | Fed. Rep. of Germany ... 15/250.34 |
| 2417128 | 10/1975 | Fed. Rep. of Germany ... 15/250.21 |
| 74020 | 11/1960 | France .............................. 15/250.34 |
| 613795 | 12/1948 | United Kingdom ............. 15/250.34 |
| 764101 | 12/1956 | United Kingdom ............. 15/250.34 |
| 2117630 | 10/1983 | United Kingdom ............. 15/250.34 |

Primary Examiner—Peter Feldman
Attorney, Agent, or Firm—Donald J. Lenkszus

[57] ABSTRACT

A windshield wiper unit has a slide which is supported so as to be movable in a longitudinal direction in a housing which is driven to and fro, and a wiper arm which is fastened with a fastening part to an end section of the slide. A low overall height is achieved by the fastening part having a recess with which it is placed on the end section of the slide in the longitudinal direction of the slide and by the end section being jammed in the recess.

35 Claims, 14 Drawing Figures

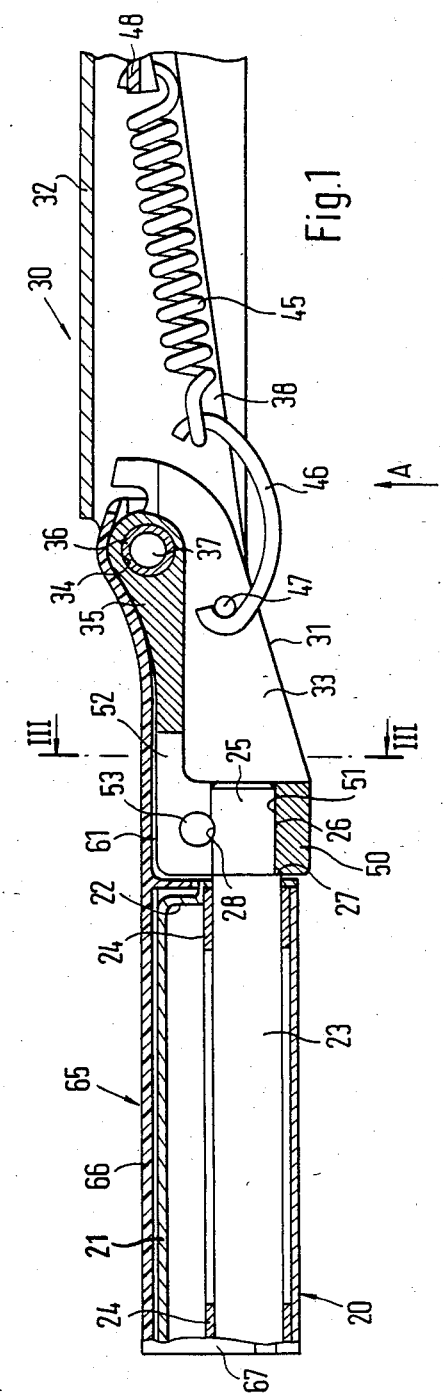
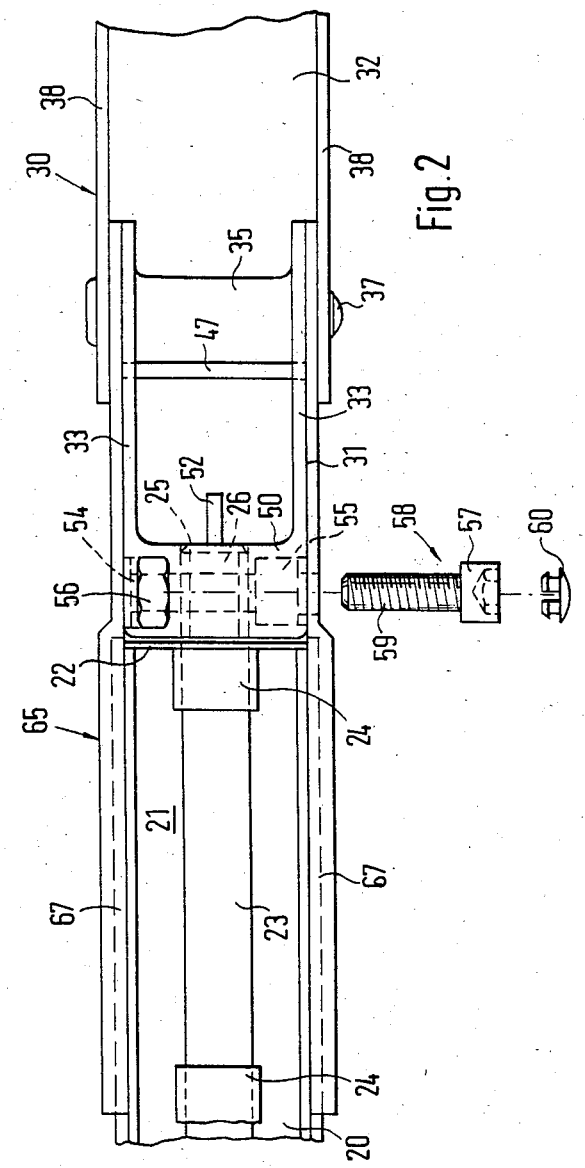
Fig.1
Fig.2

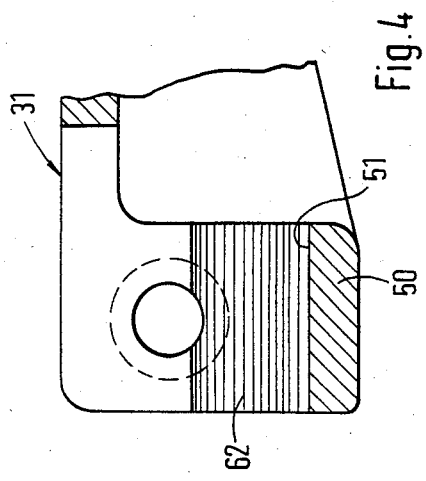
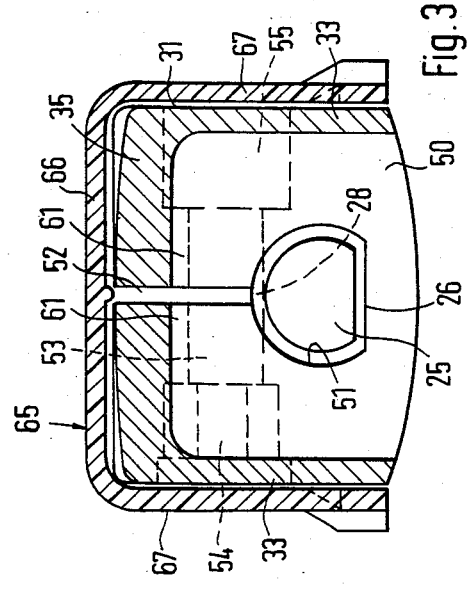
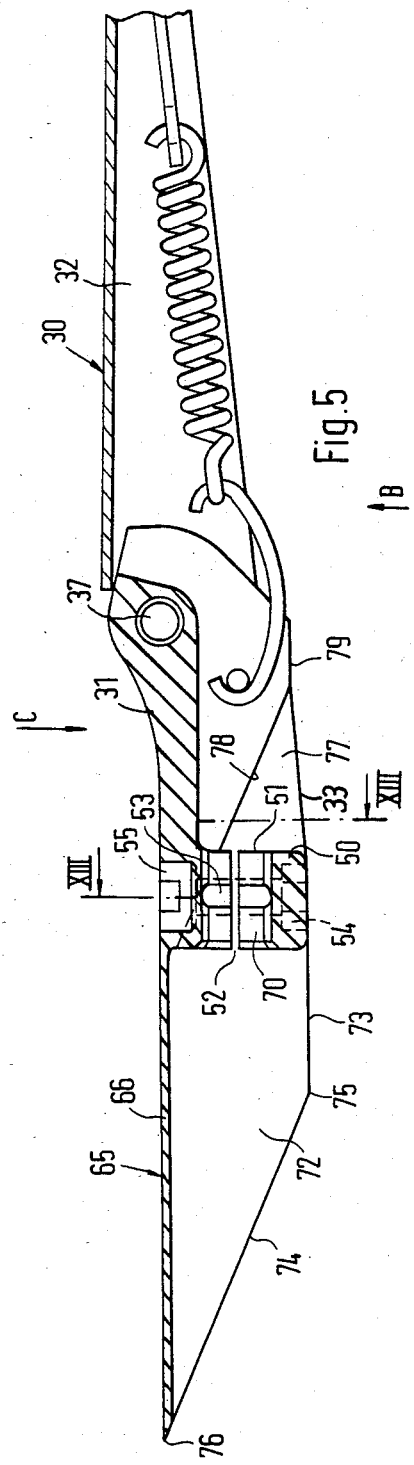

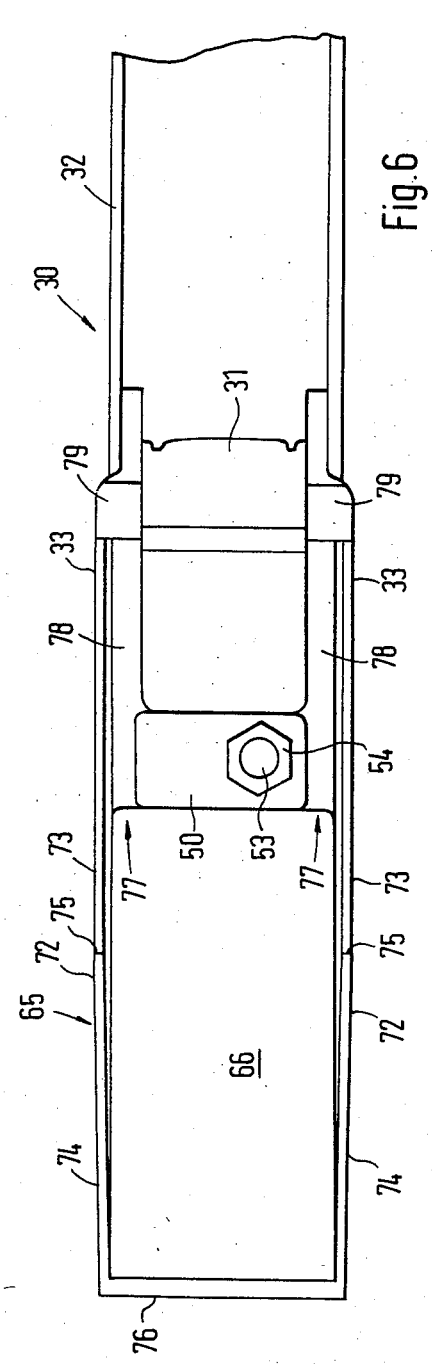
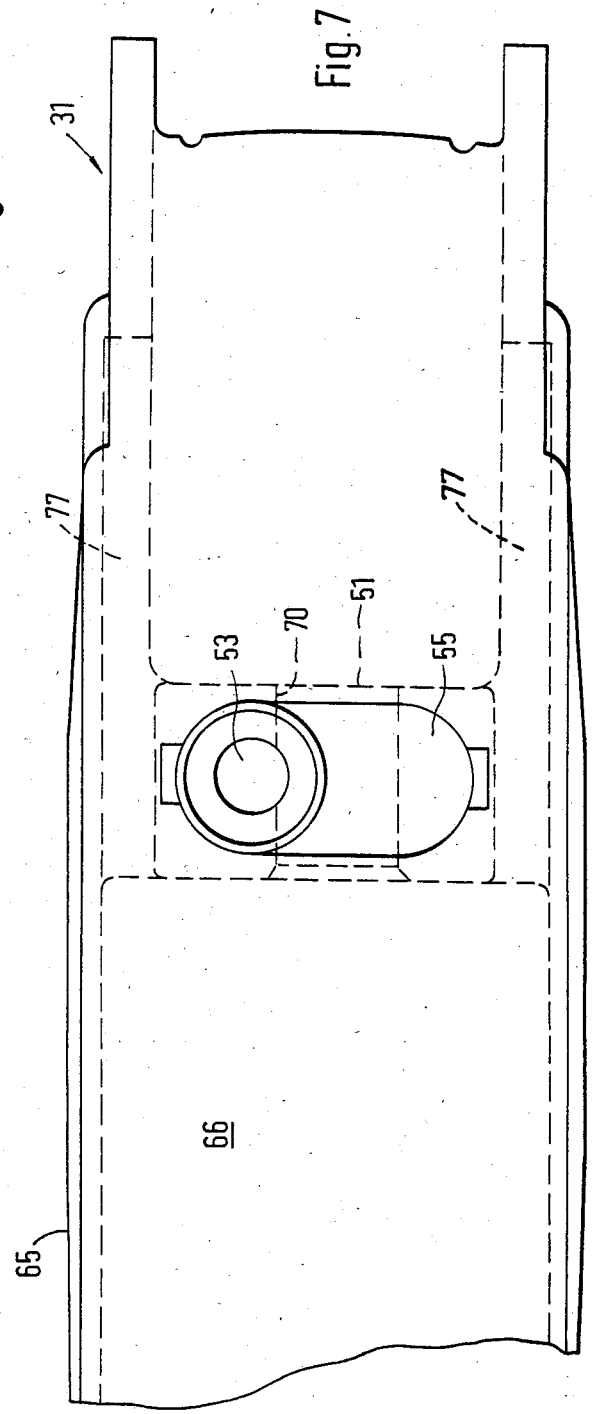

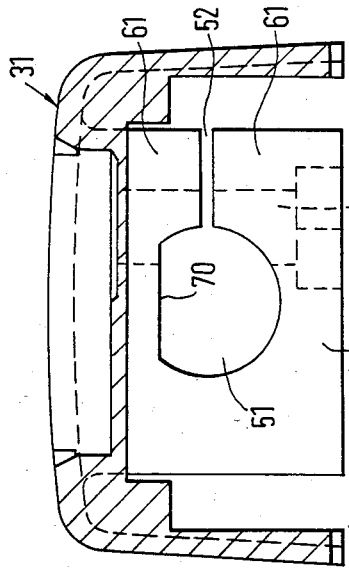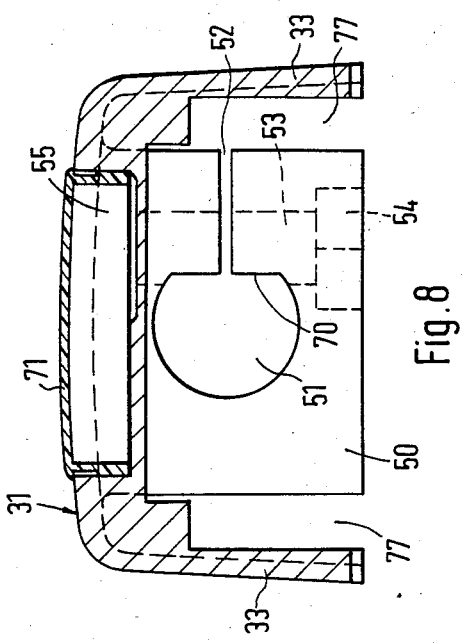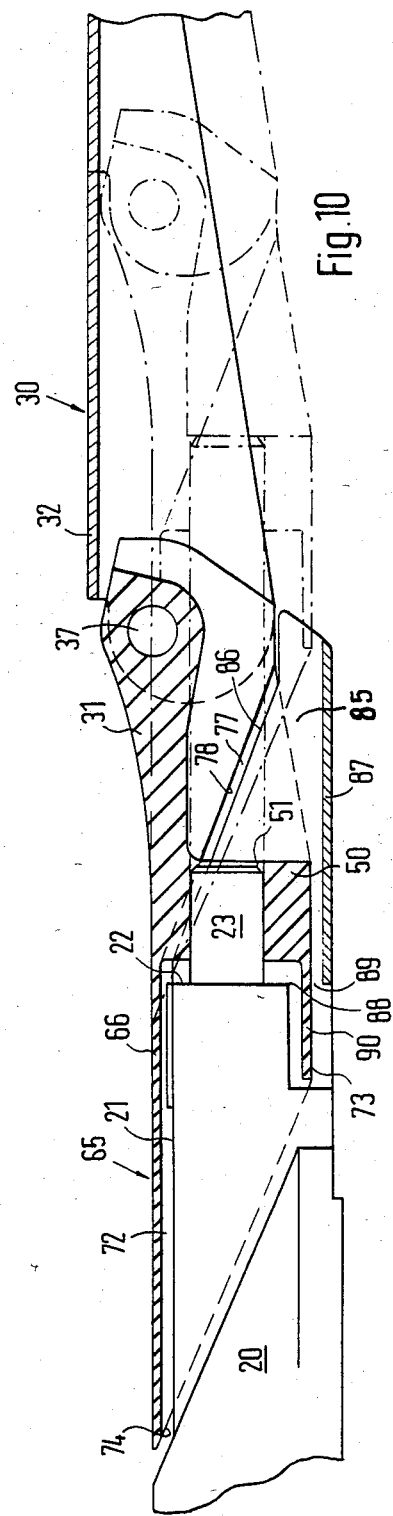

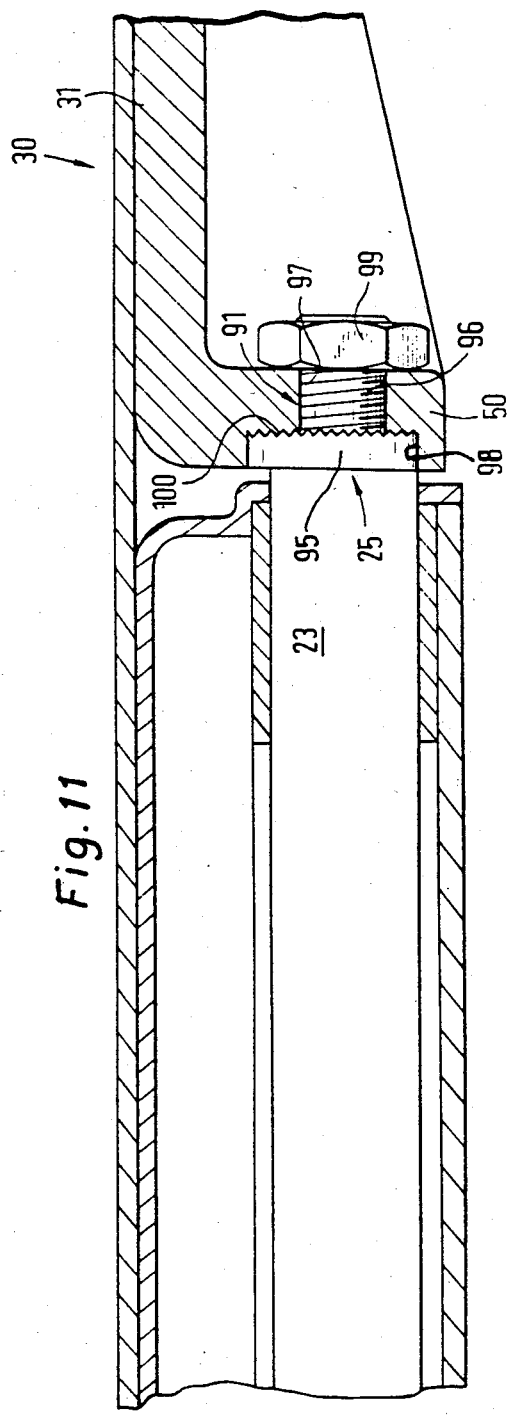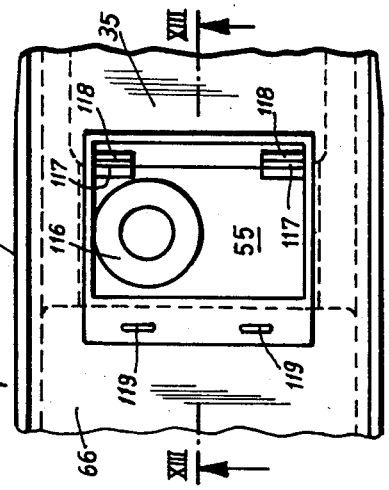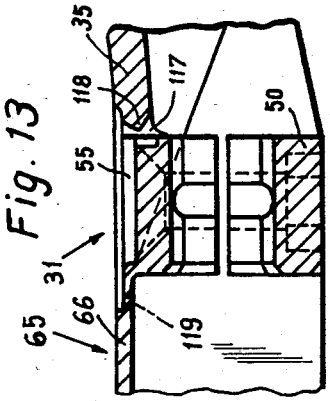

WINDSHIELD WIPER UNIT

BACKGROUND OF THE INVENTION

This invention pertains to a windshield wiper unit. In most windshield wiper units used in motor vehicles the wiper arm with its fastening part is fastened directly on a wiper shaft which is driven to and fro and extends perpendicularly to the longitudinal direction of the wiper arm. Such a windshield wiper unit is shown, for instance, in DE-OS No. 28 53 948. Forces operating on the wiper arm in the longitudinal direction therefore act perpendicularly on the wiper shaft, so that there is little danger of the wiper arm coming loose from the wiper shaft due to such forces.

To have a large wiping area, especially in the case of single-lever wiper units, some windshield wiper units have been designed in which the wiper arm can be moved back and forth in its longitudinal direction during a wiping cycle. Such a windshield wiper unit is described in DE-PS No. 24 17 128. This unit has a slide which is supported so as to be movable in its longitudinal direction in a housing which is driven to and fro. The slide is displaced by a gear during a wiping cycle. The end section of the slide projects from the housing in every position. Fastened to this end section is a bolt which protrudes from the slide perpendicularly to its longitudinal direction. A wiper arm is jammed on the bolt in a manner similar to that of wiper units in which the wiper arm is fastened directly on the wiper shaft with a fastening part. The longitudinal direction of the wiper arm is in turn perpendicular to the axis of the bolt, so that the forces acting in the longitudinal direction of the wiper arm, which are particularly great when the wiper arm is moved outwards and inwards, can be absorbed in a relatively simple manner. However, because of the projecting bolt and of the wiper arm being situated alongside the slide, the known unit has a relatively large overall height.

SUMMARY OF THE INVENTION

One object of the invention is to provide a windshield wiper unit having a low overall height especially in the area of the fastening of the wiper arm to the slide. The connection between the wiper arm and the slide must still be so firm that the wiper arm can follow both the back and forth movement of the slide and the to and fro movement of the slide and the housing.

A windshield wiper unit having a slide supported so as to be movable in a longitudinal direction in a housing which is driven to and fro and a wiper arm fastened by a fastening part to an end section of the slide according to the invention is designed such that the fastening part has a recess which is placed on the end section of the slide in the longitudinal direction of the slide and the end section is jammed in the recess. Because the wiper arm is basically axially fastened to the slide a very low overall height is possible in the area of the connection of the wiper arm with the slide. The end section of the slide is jammed in the fastening part so that the joint between the slide and the wiper arm is rigid and the wiper arm is carried along by the slide. The joint safeguards the slide and the wiper arm against reciprocal twisting around an axis in the longitudinal direction of the slide. It is advantageous to give the recess in the fastening part a cross-section which corresponds to the cross-section of the end section of the slide, so that there is, in all directions perpendicular to the longitudinal direction of the slide, form-locking between the slide and the fastening part.

In one preferred embodiment, the fastening part is jammed on the slide perpendicular to the latter's longitudinal direction. The jamming forces thus operate perpendicularly to the longitudinal direction of the slide. The jammed joint is then preferably achieved by the recess being in a fastening block of the fastening part, by the recess being opened outwards by a slot and by the two sections of the fastening block separated by the slot being pulled together by connecting means, preferably a screw and a nut.

The slot and the screw can be arranged advantageously in relation to each other and to the wiper arm. The jammed joint is particularly good when the slot lies in a radial plane of the preferably mainly cylindrical slide and the screw runs tangentially to the slide. The wiper arm can be particularly easily mounted on the slide when the screw runs perpendicular to a link rivet between the fastening part and a link part likewise belonging to the wiper arm and perpendicular to the longitudinal direction of the wiper arm. This arrangement is advantageous particularly when the unit is already mounted on a vehicle and the wiper arm has to be replaced.

Further in accordance with the invention, the screw head and a nut—if there is one—are countersunk in the fastening block. This also contributes to a low overall height and reduces the danger of damage. As protection against environmental influences, the screwhead is covered by a plastic cap which is clipped into the fastening block. This plastic cap is designed and clipped to the fastening block such that, in a plan view looking onto the wiper arm, a symmetrical picture is seen. The plastic cap thus has two assembly positions, thereby making assembly easy.

It is advantageous if the shaft of the screw which runs tangential to the slide cuts into the slide. This contributes to, among other things, compact construction of the fastening part. Secondly, the cut made into the slide can quite easily be shaped so that the screw can only be introduced into the recess in the fastening block in a certain axial position of the end section of the slide. Fastening of the wiper arm to the slide in different axial positions is therefore largely avoided. Furthermore, the jammed joint is additionally secured in the axial direction. If the cut runs tangentially to the slide, securing in the direction of rotation also results.

In a preferred embodiment of the invention, the end section of the slide is shaped with at least one flat side and the recess in the fastening block is shaped accordingly. Thereby a fixed position between the slide and the wiper arm in the direction of rotation is obtained when the fastening part of the wiper arm is pushed onto the end section of the slide. The holes in the fastening block and any cut into the slide now have to be aligned with each other only in the axial direction of the slide. The single flat side moveover constitutes an additional protection against rotation between the slide and the wiper arm.

If particularly great torsional forces acting on the wiper arm are to be expected, the joint between the wiper arm and the slide can be additionally secured against twisting of the wiper arm and the slide in relation to each other by a serration on the edge of the end section of the slide and in the recess in the fastening block.

A certain axial position of the slide and the wiper arm in relation to each other can be advantageously predetermined by the end section of the slide having a flange against which the fastening block abuts. If such a flange is present, axial jamming of the fastening part to the slide is also possible.

If the overall height in the area of the joint between the wiper arm and slide is small, it is particularly simple to achieve a design in accordance with the invention, in which the fastening part has on it a covering cap which engages telescopically over the housing in which the slide is supported so that the slide is covered in every position in both side views and in the plan view looking onto the wiper arm. It should, however, be expressly pointed out that such a design is also possible in principle if no axial fastening between the wiper arm and the slide is chosen. The covering cap is not only a trim but also protects the slide and the place where it emerges from the housing.

If the side walls of the covering cap have an inclined front edge, good coverage is obtained if, the side walls of the housing which are adjacent to the side walls of the covering cap are extended over the places where the slide emerges from the housing to form flaps and if there are recesses within the fastening part which accommodate the flaps.

The slide is covered towards the fourth side, if, the two flaps on the housing are connected to each other by a floor on the side opposite to the ceiling of the covering cap. Any water which may have penetrated can flow out through an aperture between the floor and the housing.

BRIEF DESCRIPTION OF THE DRAWINGS

The invention will be better understood from a reading of the following detailed description in conjunction with the drawings in which:

FIG. 1 is a longitudinal cross-section of a wiper unit with a jammed fastening in which the screw runs parallel to a link rivet between the fastening part and the link part of the wiper arm;

FIG. 2 is a view of the wiper unit of FIG. 1 in the direction of arrow A in which the floor of the housing accommodating the slide and the wiper arm spring are omitted;

FIG. 3 is an enlarged cross-sectional view along line III—III of FIG. 1;

FIG. 4 is a longitudinal cross-section through the fastening block of a fastening part similar to that in FIGS. 1 to 3 but with a serration in the recess for the slide;

FIG. 5 is a longitudinal section through the wiper arm of a third embodiment in which the screw for the jammed joint runs perpendicular to the link rivet and the side walls of the covering cap have a front edge running obliquely to their longitudinal edges;

FIG. 6 is a view of the wiper arm in FIG. 5 in the direction of arrow B, the wiper-arm spring being omitted;

FIG. 7 is a view in the direction of arrow C in FIG. 5 of the fastening part from FIGS. 5 and 6 shown on a larger scale;

FIG. 8 is a cross-section on an enlarged scale along line VIII—VIII in FIG. 5;

FIG. 9 is a cross-section similar to that in FIG. 8 through a modified fastening part with a different position of the slot in the fastening head and the single flat side in the recess in relation to each other;

FIG. 10 shows, partly in elevation and partly in longitudinal cross-section, a fourth embodiment with a wiper arm similar to that in FIGS. 5 to 8 and a covering of the slide on four sides;

FIG. 11 shows a sixth embodiment with jamming of the wiper arm on the slide in the axial direction;

FIG. 12 shows a plastic cap for the screw head; and

FIGS. 13 and 14 are respectively a cross-section through and a plan view of an area of a fastening part for accommodating the cap according to FIG. 12.

DETAILED DESCRIPTION

The windshield wiper unit shown in FIG. 1 to 3 includes a housing 20 driven to and fro with an elongated basically rectangular section 21 on the front side 22 of which a slide 23 emerges from the housing 20. The slide 23 is supported in two friction bearings 24 within the housing 20 such that it can be moved back and forth in the direction of its longitudinal axis. During operation this movement is superimposed on the to and fro movement of the housing 20. In a position in which the slide 23 is withdrawn furthest into the housing 20 it still protrudes with an end section 25 over the front 22 of the housing 20. The end section 25 is shaped with one flat side. The flat part 26 ends at a flange 27 which also serves as an axial stop on the slide 23. On the side opposite the flat part 26 the slide 23 has a cut 28 which has a certain radius and runs parallel to the flat part 26 and perpendiuclar to the longitudinal direction of the slide 23.

A wiper arm belonging to the unit and designed in its entirety by 30 has a fastening part 31 and a link part 32. The fastening part 31 is basically in the shape of a right-angled angle piece the two arms of which, one running in the longitudinal direction of the wiper arm and one running perpendicular to the longitudinal direction of the wiper arm, have side walls 33. In a hole 34 at the end of the arm 35 running in the longitudinal direction of the wiper arm 30 there is inserted a bearing bushing 36 in which a link rivet 37 can turn. With this rivet 37 the side walls 38 of the U-shaped link part 32 overlapping the fastening part are firmly connected.

A spiral spring 45 is hooked with its one end via a curved piece 46 to a holding pin 47 which runs between the two side walls 33 of the fastening part 31 and is secured in it. The other end of the wiper-arm spring 45 is hooked to a holding piece 48 of the link part 32.

The fastening block 50 for securing the wiper arm 30 in the slide 23 forms the second arm of the fastening part 31. The fastening block 50 has a recess 51 whose cross-section corresponds to the cross-section of the end section 25 of the slide 23, and therefore, also has a flat part. At the side opposite to the flat part the recess 51 opens outwards in a slot 52. The slot 52 runs radially in relation to a center axis of the recess 51, actually perpendicularly to the link rivet 37. It is in the area in which the fastening block 50 is connected with the arm 35 and extends a little further into the arm 35. As can be seen particularly from FIGS. 2 and 3, the center axis of the recess 51 lies in a longitudinal median plane of the wiper arm 30 running perpendicularly to the link rivet 37. The slot 52 is also in this plane. Perpendicular to the slot 52 the fastening block 50 has in it a hole 53 which runs parallel to the link rivet 37 and tangentially to the recess 51. The shortest distance between the center axis of the recess 51 and the center axis of the hole 53 is smaller than the sum of the radii of the recess 51 and the hole 53, so that the hole 53 opens towards the recess 51. The radius of the hole 53 tallies with the radius of the cut 28 on the end section 25 of the slide 23. As shown particularly by FIG. 1, the flange 27 and the cut 28 are arranged in relation to each other in such that the cut 28 is aligned with the hole 53 when the wiper arm is pushed onto the slide.

The hole 53 emerges on both sides of recesses 54 and 55 respectively of the fastening block 50 which are drawn in dashed lines in FIGS. 2 and 3. A hexagonal nut 56 is pressed captively into the recess 54, which has the same cross-section as the hexagonal nut 56. The other recess 55 accommodates the screw head 57 of a screw 58 whose shaft 59 passes through the hole 53. The screw head 57 is covered by a plastic cap 60 which can be clipped into an aperture in a covering cap 65 which is still to be described.

When, as shown in FIGS. 1 to 3, the wiper arm 30 is placed on the end section 25 of the slide 23, the screw 58 can be pushed through the hole 53 and screwed into the nut 56. Thereby the sections 61 of the fastening block 50 separated by the slot 52 are drawn together and the end section 25 of the slide 23 is jammed in the recess 51. As the shaft 59 of the screw 58 also lies in the cut 28 of the end section 25, the jammed joint is additionally secured in the axial direction. The flat part 26 additionally protects the joint against twisting.

FIG. 4 shows a fastening block 50 of another fastening part 31 in which the recess 51 is provided with a serration 62 running in the axial direction, whereby further protection against twisting is obtained if the end section of the slide also has a serration on it. Otherwise the fastening part 31 in FIG. 4 is constructed in exactly the same way as the fastening part in FIGS. 1 to 3.

The windshield wiper unit shown in these figures includes a separate covering cap 75 which is made of plastic and is fastened to the wiper arm 30. With a ceiling 66 and two side walls 67 running from the ceiling, the cap 65, when the wiper arm 30 and the slide 23 are in the retracted condition, covers the housing section 21 over a length which is somewhat greater than the stroke of the slide 23. During a longitudinal movement of the slide 23 and the wiper arm 30 the covering cap 65 slides in a telescope-like manner over the housing section 21 and covers the slide 23 through out the entire stroke on the three aforementioned sides. The covering cap 65 also covers the fastening part 31 down to below the link part 32 and, in the area of the link rivet 37, is between the side walls 33 of the fastening part 31 and the side walls 38 of the link part 32.

FIGS. 5 to 8 show a wiper arm 30 which again includes a fastening part 31 made of a metal and a link part 32 linked to it via a link rivet 37. For the jammed joint with the end section of a slide, the fastening part 31 is shaped similarly to the fastening part of the embodiment shown in FIGS. 1 to 3. It again has a fastening block 50 with a recess 51, which has on it a flat part 70 and again opens outwards in a radial slot 52. Perpendicularly to the slot and tangentially to the recess 51 is hole 33 which cuts into the recess 51 and extends from a recess 54 for a screw nut and a recess 55 for a screw head. The basic difference from the embodiment according to FIGS. 1 to 3 is that the hole 53 now runs perpendicular to the link rivet 37. Accordingly, the slot 52 lies in a plane parallel to the link rivet 37. Furthermore, as shown particularly by FIGS. 5 and 8, the flat part 70 is now by the slot 52 and not opposite the slot, as in the embodiment according to FIGS. 1 to 3. The flat part 70 is however still parallel to the hole 53. The recess 55 for the screw head is on the side of the fastening part 31 which, after fitting on a motor vehicle, is turned away from the windshield which is to be wiped. The screw used for establishing the jammed joint is therefore always easily accessible.

It can be seen from FIGS. 6 to 8 that the center axis of the recess 51 again lies in a longitudinal median plane of the wiper arm passing through the link rivet 37. The hole 53 is made asymmetrical to this plane. The recess 55 is larger than it actually needs to be for accommodating a screw head. It is in fact extended perpendicular to the aforesaid longitudinal median plane so as to occupy a symmetrical position in relation to this plane. In the cross-section in FIG. 8 the recess 55 is covered by a plastic cap 71 which, in plan view, is likewise symmetrical to the said plane. In order to create two fitting positions for the plastic cap 71, the cap is so made that is is not only symmetrical in the plan view but also in its entirety symmetrical to the plane. Neither this nor an extension of the recess 55 is absolutely necessary for obtaining symmetry in the plan view.

In the embodiment shown in FIGS. 5 to 8 the covering cap 65 is moulded to the fastening part 31 of the wiper arm 30 as a single piece. It has a ceiling 66 the length of which from the fastening block 50 again approximately corresponds to the stroke of a slide 23. Now, however, it has side walls 72 in the case of which, due to an adaptation to the shape of the housing in which the slide is situated, the longitudinal edges 73 turned away from the ceiling 66 are shorter than the ceiling 66 and a front edge 74, oblique in relation to the longitudinal edges 73, runs from the end 75 of the said longitudinal edges 73 to the end 76 of the ceiling.

The fastening block 50 is divided from the two side walls 33 of the fastening part 31 by recesses 77. The side walls 33 continue the side walls 72 of the covering cap 65. Each recess 77 ends on the side towards the link rivet 37 at a step 78 which begins inside at the ceiling 66 of the covering cap 65 and runs roughly parallel to the front edges 74 of the side walls 72 of the covering cap 65 down to the lower edge 79 of the side wall 33 in question of the fastening part 31. Before the importance of the recesses 77 is discussed in connection with the description of FIG. 10, the fastening part 31 in FIG. 9 will now be considered. In this, the flat part 70 of the recess 51 is not perpendicular to the slot 52 but lies parallel to it and perpendicular to the hole 53. The flat part 70 is in fact by the section 61 of the fastening block 50 which, when the jamming takes place, changes its position in relation to the rest of the fastening part 31 less than the other section 61 of the fastening block 50. A fairly accurate coordination in the direction of rotation between the slide and the wiper arm is thus obtained.

FIG. 10 shows a windshield wiper unit in which the arrangement of a recess 51 and a hole for the insertion of a screw in the fastening block is the same as that shown in FIGS. 5 to 9. A link part 32 is again linked to the metal fastening part 31 by a link rivet 37. The covering cap 65 and the recesses 77 in the fastening part 31 also correspond to those in FIGS. 5 to 9. FIG. 10 shows clearly how the side walls 72 of the covering cap 65 are adapted to the shape of the housing 20 by means of the oblique edges 74. The covering cap 65 telescopically overlaps the housing section 21 which, in the direction of the view shown in FIG. 10, is narrower than the rest of the housing 20. The side walls of the housing section 21 adjacent to the side walls 72 of the covering cap 65 are extended beyond the front 22 to form flaps 85 which, in the retracted condition of the wiper arm 30, extend into the recesses 77 of the fastening part 31. The flaps 85 end in an oblique edge 86 which is parallel to the step 78 and is situated, in the aforesaid position of the wiper arm, a little distance in front of the step 78. As the edge 74 and the step 78 are approximately parallel to each other, the edge 86 is likewise approximately parallel to the edge 74.

At the edges opposite to the ceiling 66 of the covering cap 65 the flaps are connected with each other by a floor 87, resulting in cross-section, in a U-shaped structure. The floor 87 is at a distance to the adjacent edge 88 on the front 22 of the housing section 21. Although it begins at the level of the front 22, there is thus, between it and the housing section 21, an aperture 89 through which the liquid which has penetrated between the flaps 86 can drain away.

In FIG. 10 the position assumed by the slide 23 and the wiper arm 30 when they are fully extended is drawn in with dot-dash lines. It can be seen that in this extended position the ceiling 66 of the covering cap 65 still extends beyond the housing section 21 and that the side walls 72 of the covering cap 65 and the flaps 85 still overlap, so that the slide 23 is covered on three slides. On the fourth side it is covered by the floor 87. There is, however, still a gap between the floor 87 and the fastening block 50. At about the level of the short longitudinal edges 73 of the side walls 72 of the covering cap 65 there is therefore moulded to the fastening block 50 a flap 90 which extends away from the fastening block in the direction of the ceiling 66 of the covering cap 65 and is internally at a distance from the floor 87. In the extended position of the wiper arm 30 this flap closes the gap between the floor 87 and the fastening block 50, so that the slide 23 is completely covered. In the retracted position of the slide 23 and the wiper arm 30 the flap 90 extends beyond the edge 88 of the housing section 21 below this. The flap 90 is not connected with the side walls 72 of the covering cap 65, as the flaps 85 of the housing section 21 take up space between it and these side walls.

FIG. 11 shows a windshield wiper unit according to the invention in which the fastening part 31 is jammed on the movable slide 23 not in the radial direction but in the axial direction. The end section 25 of the slide 23 is made up of an eccentric flange 95 and a screw 96, which is concentric to the slide 23 but smaller in diameter. Corresponding to the end section 25 the recess 51 in the fastening block 50 contains a hole 97 for the passage of the screw 96 and an eccentric recess 98 in which the flange 95 lies. The fastening block 50 is pressed against the flange 95 by the nut 99 screwed onto the screw 96. The eccentricity of the flange 95 prevents rotation and allows the wiper arm 30 to be fitted only in a very specific position in relation to the slide 23. Additional protection against rotation can be obtained by means of a serration 100 on the flange 95 and on the adjacent surface of the recess 51.

FIG. 12 shows a plastic cap 71 which is modified as compared with FIG. 8, said cap 71 consisting of two sections 111 and 112 which are connected via the film hinge 110 and are pivotable in relation to each other. The section 111 has two locking arms 113 each with a detent 114. The appreciably smaller section 112 has two straight lugs 115 which, in the level condition of the cap 72, which corresponds to the normal condition after fitting on the wiper arm, point in the same direction as the locking arms 113. The cap 71 is symmetrically shaped in relation to a median plane parallel to the plane of the drawing. After fitting on the wiper arm, the median plane tallies with a median plane of the wiper arm, so that altogether a symmetrical picture is produced.

The fastening part 31 in FIGS. 13 and 14 is so shaped in the area of its fastening block 50 that the symmetrical plastic cap 71 shown in FIG. 12 can be attached to it. Because the plastic cap is shaped symmetrically in relation to the median plane but the screw head, as is shown by the countersinking 116 in the recess 55, is to the side of the median plane of the wiper arm, the recess 55 is larger than is actually necessary for countersinking the screw head.

Adjacnet the fastening block 50 the shank 35 of the fastening part 31 has two apertures 117, in each of which a detent 118 is moulded. By the arrangement in the shank 35, the detent 118 can easily be deformed. When the cap 71 shown in FIG. 12 is fitted on the wiper arm, the locking arms 113 of the cap are inserted in the recesses 117 and engage with their detents 114 behind the detents 118.

For the insertion of the lugs 115 on section 112 of the plastic cap 71, two apertures 119 are provided in the ceiling 66 of the covering cap 65 which is made in a single piece with the fastening part 31.

When the cap 71 is fitted, the lugs 115 are inserted into the apertures 119 with a rectilinear movement. If the cap is in a level condition when fitted, the locking arms 113 are also pressed rectilinearly into the apertures 117. It is also possible, however, first of all to insert only the lugs 115 and then to pivot the section 111 with the locking arms 113. The film hinge 110 runs perpendicular to the longitudinal direction of the wiper arm.

In order to gain access to a screw head in the recess 116, all that has to be done is to pivot the section 111 of the plastic cap 71. The section 112 retains its position, so that the cap remains on the wiper arm whenever the latter is removed.

What is claimed is:

1. A windshield wiper unit comprising:
    a housing which is driven to and fro;
    a cylindrical slide supported in said housing and movable in its longitudinal direction;
    a wiper arm;
    said wiper arm including a fastening part for fastening said wiper arm to an end section of said slide, said fastening part having a recess directed in the longitudinal direction of said wiper arm, said recess being adapted to receive said end section in said longitudinal direction of said slide, said end section being jammed into said recess.

2. A wiper united in accordance with 1 wherein:
    said fastening part is jammed on said slide in a direction perpendicular to the longitudinal direction of said slide.

3. A wiper unit in accordance with claim 2, wherein: said fastening part comprises:
    a fastening block, said recess being in said fastening block, said fastening block having first and second portions separated by a slot extending outward from said recess; and
    connecting means for drawing said first and second portions together.

4. A wiper unit in accordance with claim 3, wherein said slot lies in a plane radially extending from said slide.

5. A wiper unit in accordance with claim 3, wherein said connecting means comprises a screw extending in said first and second portions tangentially to said slide and approximately perpendicularly to said slot.

6. A wiper unit in accordance with claim 5, wherein:
said wiper arm comprises a link; and
said wiper unit comprises:
a link rivet coupling said link and said fastening part, and said screw extends parallel to said link rivet.

7. A wiper unit in accordance with claim 5, wherein:
said wiper arm comprises a link; and
said wiper unit comprises:
a link rivet coupling said link and said fastening part, said screw extends perpendicularly to said link rivet and perpendicularly to the longitudinal direction of said wiper arm.

8. A wiper unit in accordance with claim 5, wherein:
said connecting means comprises a nut for coupling to said screw, and
the head of said screw and/or said nut are countersunk in recesses in said fastening block.

9. A wiper unit in accordance with claim 8, wherein: said nut is pressed captively into one of said recesses.

10. A wiper unit in accordance with claim 8, comprising:
a plastic cap covering the head of said screw, said plastic cap being fastened to said fastening block or to a cap covering said fastening block.

11. A wiper unit in accordance with claim 10, wherein:
said screw head is arranged asymmetrically in relation to a plane running in the longitudinal direction of said wiper arm and perpendicularly to a link rivet between the fastening part and a link part of the wiper arm and that the plastic cap is larger than the screw head and is shaped, in plan view, symmetrically to the plane.

12. A wiper unit in accordance with claim 11, wherein said plastic cap as a whole is shaped so as to be symmetrical to the plane in the fitted position and that if necessary the recess for the screw head is extended to accommodate the cap.

13. A wiper unit in accordance with claim 5, wherein: said slide has a channel, and the shaft of said screw extends in said channel.

14. A wiper unit in accordance with claim 13, wherein said channel has a radius at least approximately that of the radius of said shaft.

15. A wiper unit in accordance with claim 5, wherein: said end section of said slide has at least one flat side and said recess includes a mating surface adapted to engage said flat side.

16. A wiper unit in accordance with claim 15, wherein:
a plane side of said recess lies parallel to said screw, preferably adjacent said slot.

17. A wiper unit in accordance with claim 15, wherein:
a plane side of said recess lies at least approximately perpendicularly to said screw and is preferably at the section of said fastening block which, when said end section of said slide is jammed in said recess, changes its position in relation to the other sections of said fastening part to a smaller extent than the other section of said fastening block.

18. A wiper unit in accordance with claim 1, wherein: said end section of said slide and recess of said fastening part have a serration.

19. A wiper unit in accordance with claim 3, wherein: said end section includes a flange against which said fastening block abuts.

20. A wiper unit in accordance with claim 19, wherein:
said end section passes through said recess; and
said fastening block is jammed between a screw head or a screw nut which are screwed to said end section and said flange.

21. A wiper unit in accordance with claim 20, wherein said flange and said fastening block are serrated together.

22. A wiper unit in accordance with claim 3, comprising:
a covering cap on said fastening part, said covering cap engages telescopically over said housing so that said slide is covered in each postion as viewed from the two sides and in the plan view onto the wiper arm.

23. A wiper unit in accordance with claim 22, wherein:
said covering cap includes two side walls and a ceiling connecting said side walls, each of said two side walls having a longitudinal edge opposite said ceiling which is shorter than said ceiling and a front edge oblique to said longitudinal edge extending from one end of said longitudinal edge to an end of said ceiling;
said housing having side walls adjacent said two covering cap side walls, said housing side walls each having a flap extending beyond the exit point of said slide from said housing;
said fastening part having recesses adapted to receive said flaps.

24. A wiper unit in accordance with claim 23, wherein each flap has an edge running approximately parallel to said oblique front edge.

25. A wiper unit in accordance with claim 24, wherein said flaps are connected by a floor on the side opposite said covering cap ceiling.

26. A wiper unit in accordance with claim 25, comprising an aperture for said slide between said floor and said housing.

27. A wiper unit in accordance with claim 25, wherein:
said fastening block includes a flap positioned at approximately the height of said longitudinal edges and extending in the direction of said covering cap, said flap covering the area between said fastening block and said floor between said housing flaps when said wiper arm is in an extended position.

28. A wiper unit in accordance with claim 25, wherein:
said floor is spaced apart from the neighboring edge of said housing at the exit of said slide, said floor extending in the longitudinal direction of said slide at least as far as said edge.

29. A wiper unit in accordance with claim 22, wherein said covering cap is moulded in a single piece to said fastening part.

30. A wiper unit in accordance with claim 10, wherein said plastic cap can be pivoted away from said screw head.

31. A wiper unit in accordance with claim 30, wherein said plastic cap has two sections connected with a film hinge, one of said two sections being fixed and the other being pivotable.

32. A wiper unit in accordance with claim 31, wherein said pivotable section includes means for locking said pivotable section in a fixed position.

33. A wiper unit in accordance with claim 32, wherein said pivotable section has locating arms which, viewed in the longitudinal direction of said wiper arm, are pivotable in front of or behind said fastening block into through an aperture of said fastening part to engage there behind a detent.

34. A wiper unit in accordance with claim 33, wherein said fastening part includes a recess; and
   said fixed section has at least one projection adapted to enter said recess.

35. A wiper unit in accordance with claim 34, wherein: said film hinge runs across the longitudinal direction of the wiper arm.

* * * * *